C. A. DE YARMAN.
COUPLING DEVICE.
APPLICATION FILED SEPT. 30, 1915.
1,230,134. Patented June 19, 1917.
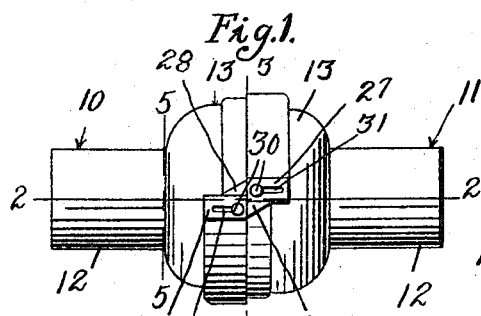
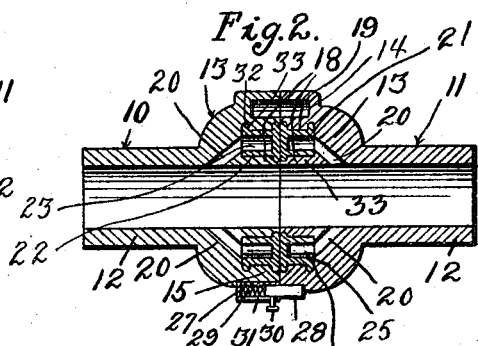
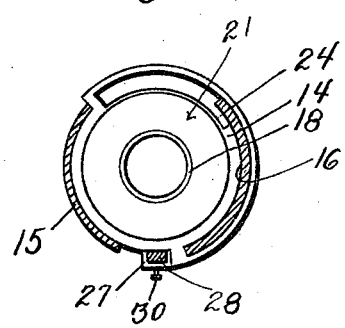
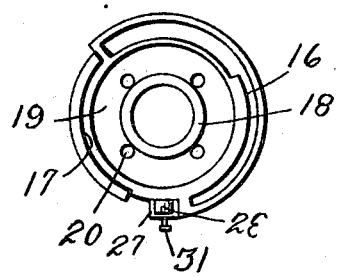
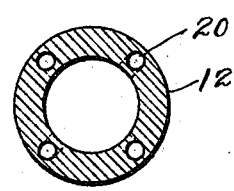
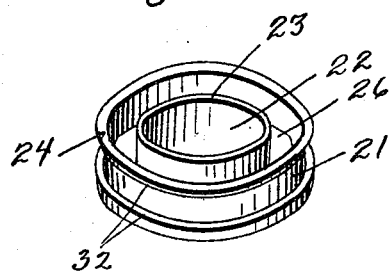
Inventor
C. A. DeYarman

S. PATENT OFFICE.

CHARLES A. DE YARMAN, OF GARO, COLORADO.

COUPLING DEVICE.

1,230,134.   Specification of Letters Patent.   Patented June 19, 1917.

Application filed September 30, 1915. Serial No. 53,422.

*To all whom it may concern:*

Be it known that I, CHARLES A. DE YARMAN, a citizen of the United States, residing at Garo, in the county of Park, State of Colorado, have invented certain new and useful Improvements in Coupling Devices; and I do hereby declare the following to be a full, clear, and exact description of the invention, such as will enable others skilled in the art to which it appertains to make and use the same.

This invention relates to improvements in coupling devices and particularly to coupling devices for use in connection with air, gas, water or steam conductors.

The principal object of the invention is to provide a coupling which will be fluid or gas tight, and of such construction that the pressure of fluid will act on the gasket.

Another object is to provide an improved gasket which is of such construction that pressure of fluid or gas will expand the same against the walls of the coupling so as to make the same liquid and gas proof.

Other objects and advantages will be apparent from the following description when taken in connection with the accompanying drawing.

In the drawing:

Figure 1 is an elevation of a coupling made in accordance with my invention.

Fig. 2 is a longitudinal sectional view on the line 2—2 of Fig. 1,

Fig. 3 is a vertical section on the line 3—3 of Fig. 1,

Fig. 4 is an end view of one of the parts of the coupling,

Fig. 5 is a vertical section on the line 5—5 of Fig. 1,

Fig. 6 is a perspective view of the gasket.

Referring particularly to the accompanying drawing, 10 represents one member of the coupling as a whole and 11 the other member. Each of the members includes a hollow stem 12 and an outwardly flaring head 13. Formed on the periphery of the head and extending around a distance slightly greater than a semi-circle is a groove 14. On the opposite edge of the head is a longitudinally disposed and curved flange 15. A portion of the inner wall of the groove 14 is provided with a rib 16 of a width practically one-half of the depth of the groove while the flange 15 has formed on its inner face a similarly shaped and sized rib 17.

In applying the sections of the coupling the rib of each part is inserted into the groove of the other part, and then upon rotating the parts in opposite directions, the ribs of the flanges will engage under the ribs of the grooves and lock the parts together.

In the center of each of the heads is a longitudinally extending and circular flange 18, and between this flange and the side of the head is formed a circular channel 19. Formed through the bottom wall of this channel are the inwardly inclined passages 20 which open into the wall of the bore of the hollow stem 12. Seated within the channel 19 of each of the members 10 and 11 is my improved washer 21. This washer has a central opening 22 and spaced annular walls 23 and 24. Thus there is formed a circular channel 26 between the walls 23 and 24 which is disposed over the ends of the openings 20 leading to the channel 19. When liquid or gas passes through the stems 12 a portion of this liquid or gas will pass through the openings 20 and into the circular channel 26 of the washer. The resulting pressure within the washer will expand the washer so that it will snugly engage all of the adjacent portions of the coupling members.

With this construction a coupling is formed which is liquid and gas tight, and the greater the pressure of the liquid or gas the more firmly the washer will be pressed against the walls of the coupling.

Each of the heads carries a pair of casings 27 formed on diametrically opposite sides thereof, and in these casings are slidably disposed the bevel-nosed bolts 28, normally urged outwardly by the springs 29. The bolts snap past each other when the heads are rotated into interlocking engagement, thereby holding said heads against uncoupling movement. Each bolt has a pin 30 extending through a slot 31 in the casing, whereby the bolts may be withdrawn to permit rotation of the heads.

The washers of the two sections of the coupling are identical in construction, as shown. The outer ends of the washers project a short distance beyond the ends of the coupling sections so that they will be compressed together when the coupling is in closed and locked position.

The washers are provided with annular beads 32 which are adapted to seat in the grooves 33 formed in the respective coupling members.

What is claimed is:

1. A coupling comprising two interlocking members each having a circular channel therein, and a longitudinal bore, each of the members having inclined passages extending from the bore into the circular channel, said channel being provided with grooves in its outer wall at each end thereof and a hollow gasket disposed in the said channel and having its open end disposed over the passages of the coupling whereby the fluid pressure will enter the gasket and distend the same into intimate contact with parts of the couplings, said gaskets having peripheral ribs engaging said grooves and the ends of said gaskets abutting each other.

2. The combination with a two-part coupling having auxiliary passages for fluid pressure to pass therethrough, of a gasket consisting of a pair of concentrically arranged walls and a connecting end wall disposed between the coupling members in position to receive fluid pressure therein so that the gasket will extend into intimate contact with the parts of the coupling, the outer wall having peripheral ribs at its ends.

In testimony whereof, I affix my signature, in the presence of two witnesses.

CHARLES A. DE YARMAN.

Witnesses:
C. V. MOORE,
A. L. KNOX.

Copies of this patent may be obtained for five cents each, by addressing the "Commissioner of Patents, Washington, D. C."